(12) United States Patent
Keener (10) Patent No.: US 10,572,698 B1
(45) Date of Patent: Feb. 25, 2020

(54) CREDIT CARD SKIMMER DETECTOR

(71) Applicant: Zephyrus Electronics, Ltd., Tulsa, OK (US)

(72) Inventor: David James Keener, Tulsa, OK (US)

(73) Assignee: Zephyrus Electronics, Ltd., Tulsa, OK (US)

( * ) Notice: Subject to any disclaimer, the term of this patent is extended or adjusted under 35 U.S.C. 154(b) by 0 days.

(21) Appl. No.: 16/183,905

(22) Filed: Nov. 8, 2018

Related U.S. Application Data (60) Provisional application No. 62/618,409, filed on Jan. 17, 2018.

(51) Int. Cl.
*G06K 7/00* (2006.01)
*G08B 21/24* (2006.01)

(52) U.S. Cl.
CPC ......... *G06K 7/0056* (2013.01); *G06K 7/0095* (2013.01); *G08B 21/24* (2013.01)

(58) Field of Classification Search
CPC ..... G06K 7/0056; G06K 7/0095; G08B 21/24
USPC ........................................................ 235/439
See application file for complete search history.

(56) References Cited

U.S. PATENT DOCUMENTS

| | | | |
|---|---|---|---|
| 6,367,695 B1 | 4/2002 | Mair et al. | |
| 6,390,367 B1 | 5/2002 | Doig | |
| 8,225,993 B2 | 7/2012 | Jenkins et al. | |
| 8,556,168 B1 | 10/2013 | Lewis et al. | |
| 8,640,947 B1 | 2/2014 | Lewis et al. | |
| 2001/0020640 A1 | 9/2001 | Yokochi | |
| 2007/0080215 A1 | 4/2007 | Ramachandran et al. | |
| 2009/0201372 A1 | 8/2009 | O'Doherty et al. | |
| 2010/0187300 A1 | 7/2010 | Ramachandran et al. | |
| 2013/0146662 A1* | 6/2013 | Randolph | G06K 7/0056 235/439 |
| 2014/0158768 A1 | 6/2014 | Ray et al. | |
| 2014/0372305 A1 | 12/2014 | Ray et al. | |
| 2019/0138761 A1* | 5/2019 | Akahane | G06K 7/10 |

FOREIGN PATENT DOCUMENTS

| | | |
|---|---|---|
| EP | 2790163 | 4/2013 |
| GB | 2421300 | 6/2006 |

\* cited by examiner

*Primary Examiner* — Daniel A Hess
(74) *Attorney, Agent, or Firm* — Chad Hinrichs (57) ABSTRACT

A system and method for detecting the presence of a skimmer in the credit card reader of a kiosk such as a gas pump, ATM or other self-service vending machine which conducts the transaction directly with the consumer without interaction of an attendant or clerk. A light source and a light sensor are located on either side of a card slot on the credit card reader. When the light source is blocked from the light sensor for a predetermined length of time, an alarm is triggered. The alarm may notify an attendant or security to investigate any issues with the credit card reader. The light source is pulsed on and off at a predetermined frequency to differentiate it from ambient light and other light sources.

9 Claims, 10 Drawing Sheets

CREDIT CARD SKIMMER DETECTOR

PRIORITY CLAIM

The present application claims the priority of and is a continuation-in-part of U.S. Provisional No. 62/618,409 filed on Jan. 17, 2018.

FIELD OF THE INVENTION

The present invention relates generally to credit card fraud prevention. More particularly, the present invention relates to a device which detects the presence of a skimmer in a credit card reader.

BACKGROUND OF THE INVENTION

Credit cards are commonly used as a form of payment in retail business transaction. They provide a fast and efficient way to exchange money and track the expenses incurred. One of the drawbacks to the use of credit cards is credit card fraud. Individuals can obtain fraudulent payments from the credit card companies or use them to purchase goods and services by obtaining the account information off of the card.

While the threat of credit card fraud has been well known when dealing with a sales clerk or waiter in person, there has been a rise in credit card fraud arising from transactions at self-service kiosks such as gas pumps, ATMs, vending machines or any other type of device where a customer personally presents a credit card to a machine for payment of a transaction. Here the perpetrator or pirate uses an electronic device to intercept the digital information obtained from the magnetic strip on the credit card. This digital information can then be used to obtain fraudulent payments from the credit card company or illegally purchase goods and services.

Originally the interception of the digital information was done by opening a service panel on the kiosk and plugging in an electronic device that intercepts the digital information while allowing the same information to proceed to the kiosk retailer and carry out the legitimate transaction. The digital information would then be retrieved by the pirate, either wirelessly or by physically retrieving a memory card from the skimmer. This left the card holder, merchant and the credit card company unaware that the information had been stolen until fraudulent transactions are noticed on the monthly statement by the card holder. Tighter security on access to the service panels of the kiosks has greatly reduced this original method of digital credit card piracy.

Figure 1:
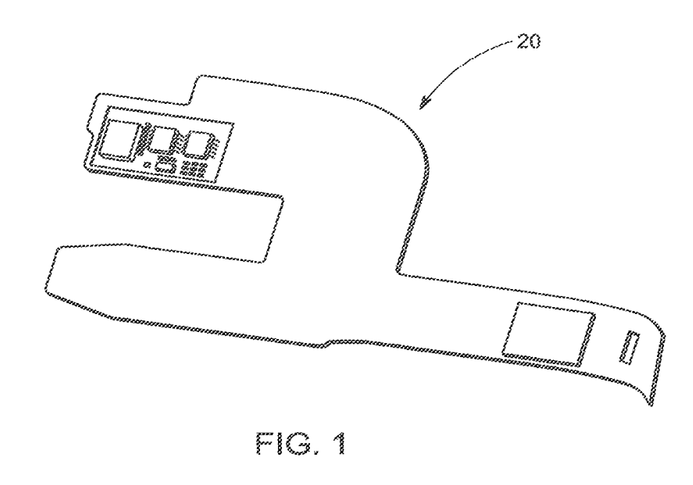
FIG. 1 is credit card skimmer.
Figure 2:
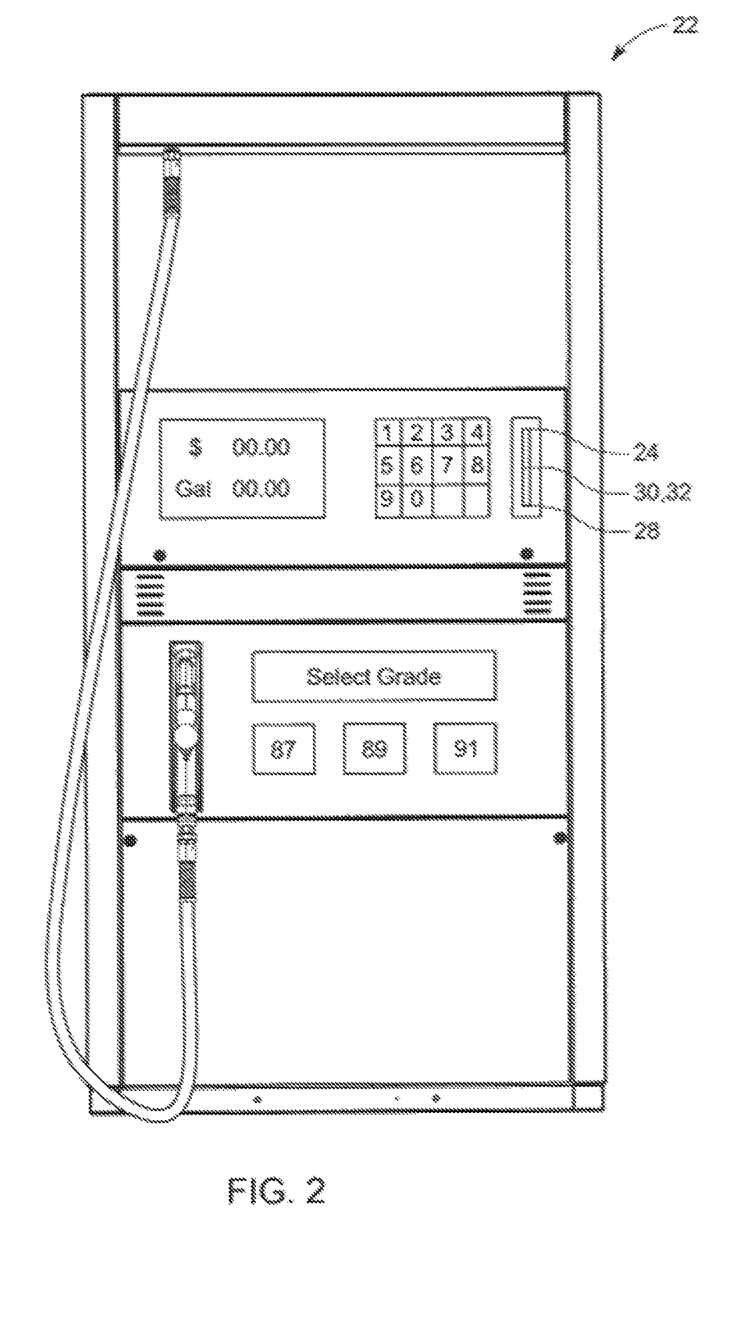
FIG. 2 is a perspective view of a credit card reader with the present invention installed.
Figure 3:
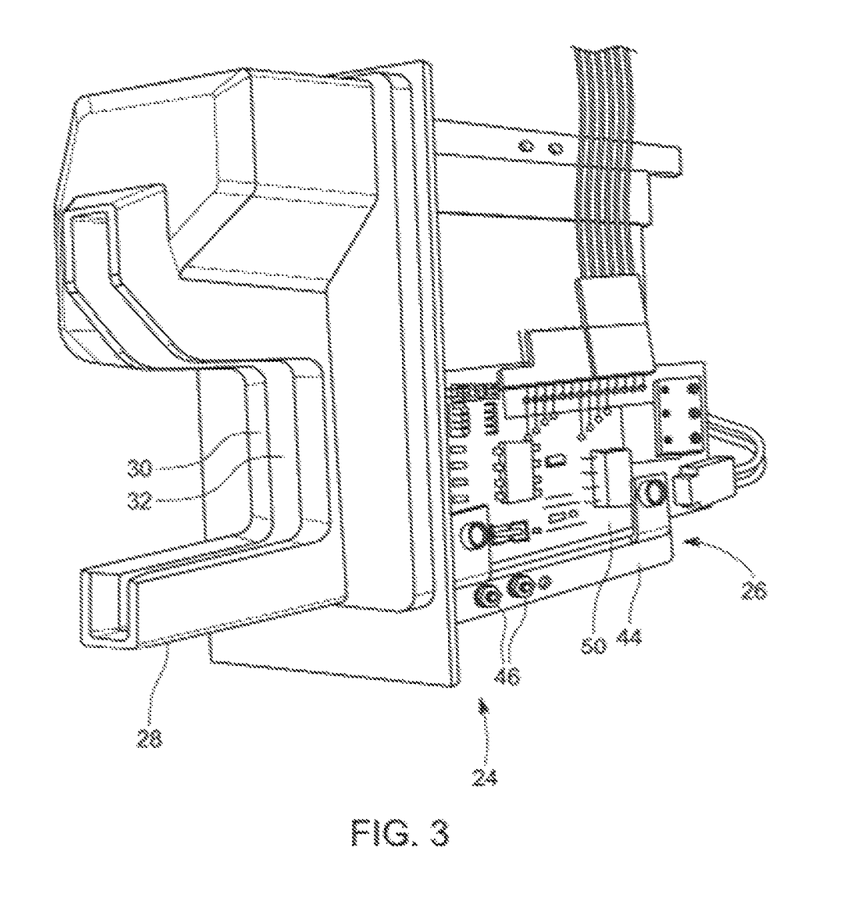
FIG. 3 is a view of the front of a credit card reader.
Figure 4:
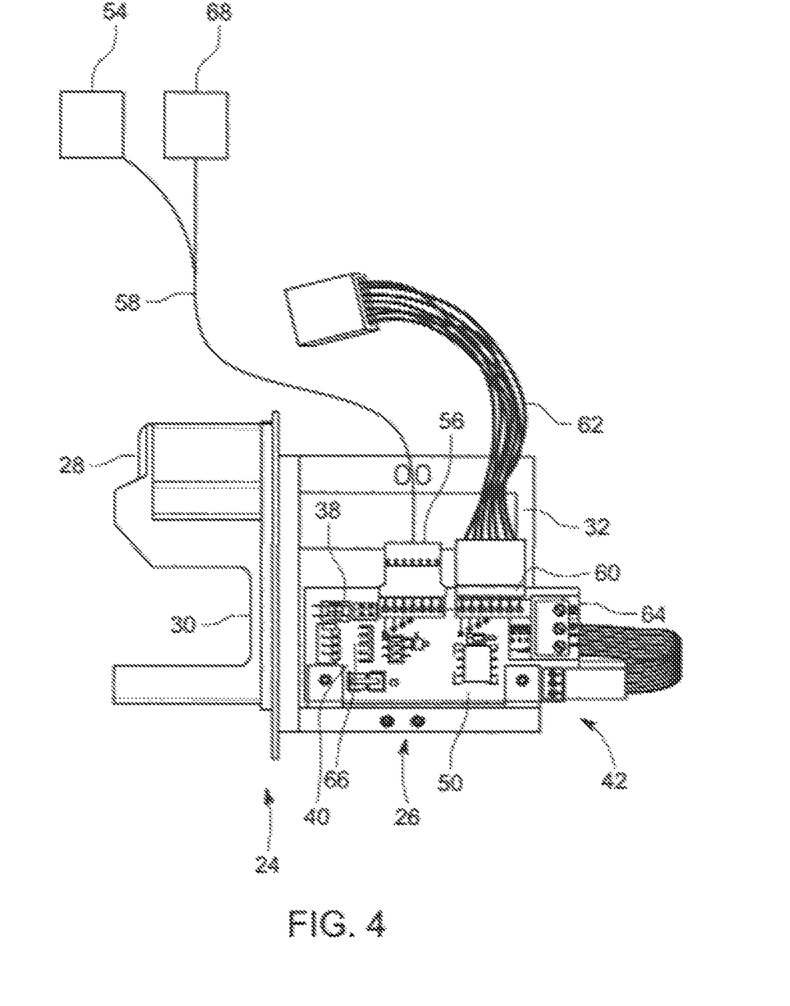
FIG. 4 is a right-side view of a credit card reader with the present invention installed.
Figure 5:
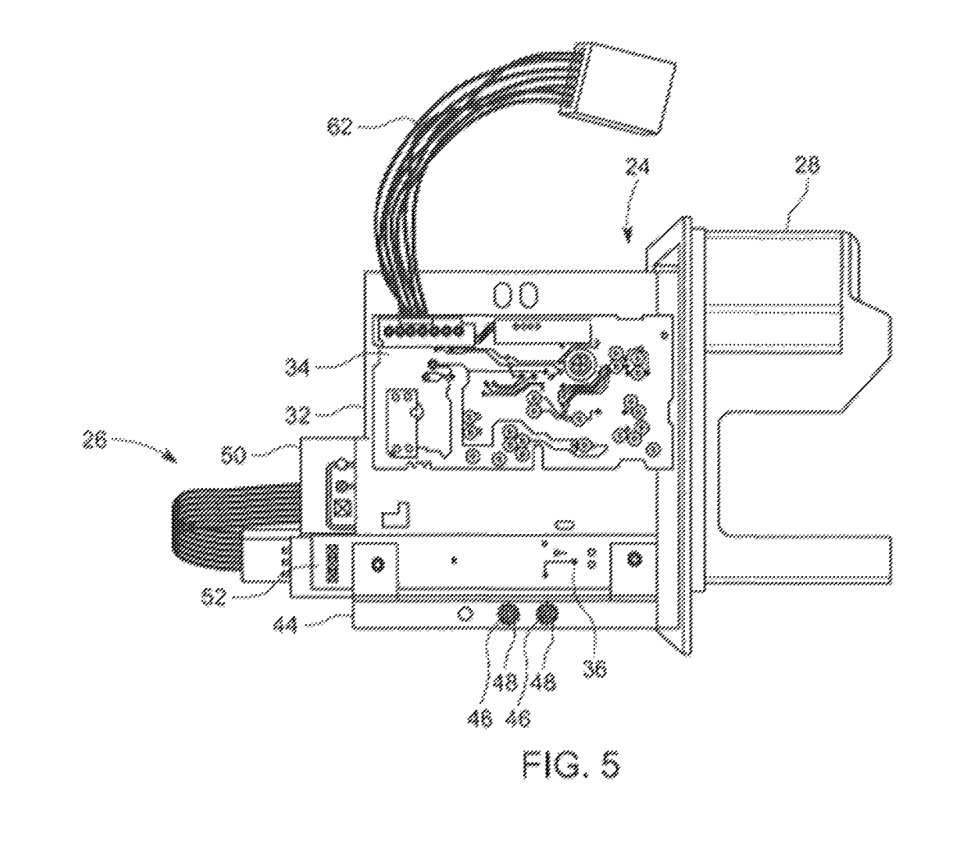
FIG. 5 is a left-side view of a credit card reader with the present invention installed.
Figure 6:
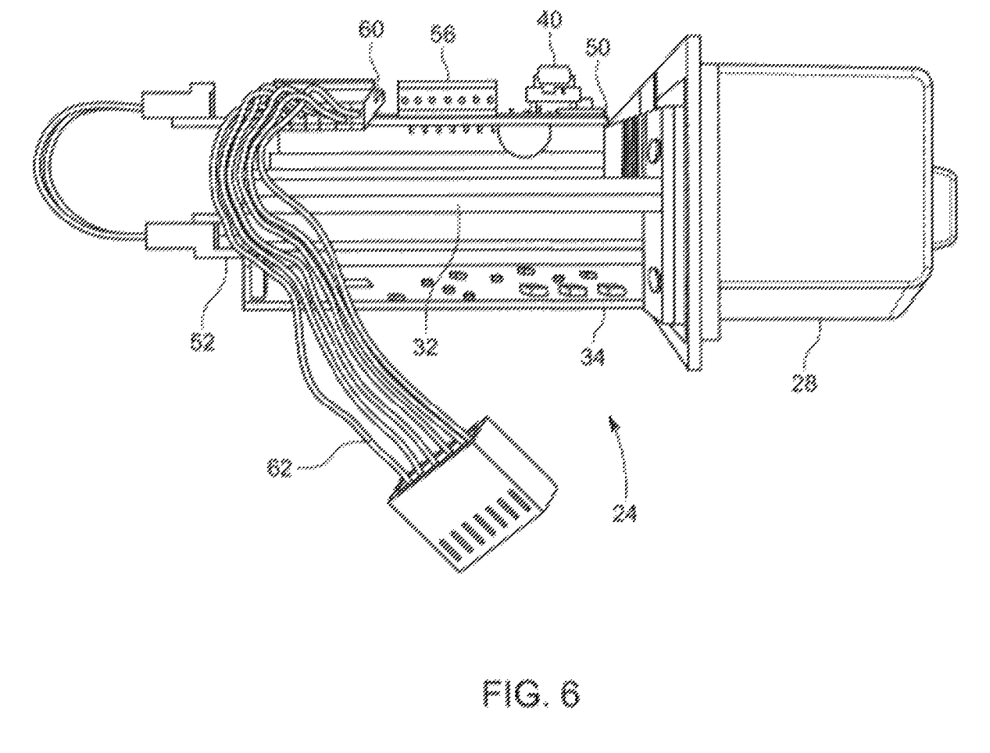
FIG. 6 is a top view of a credit card reader with the present invention installed.
Figure 7:
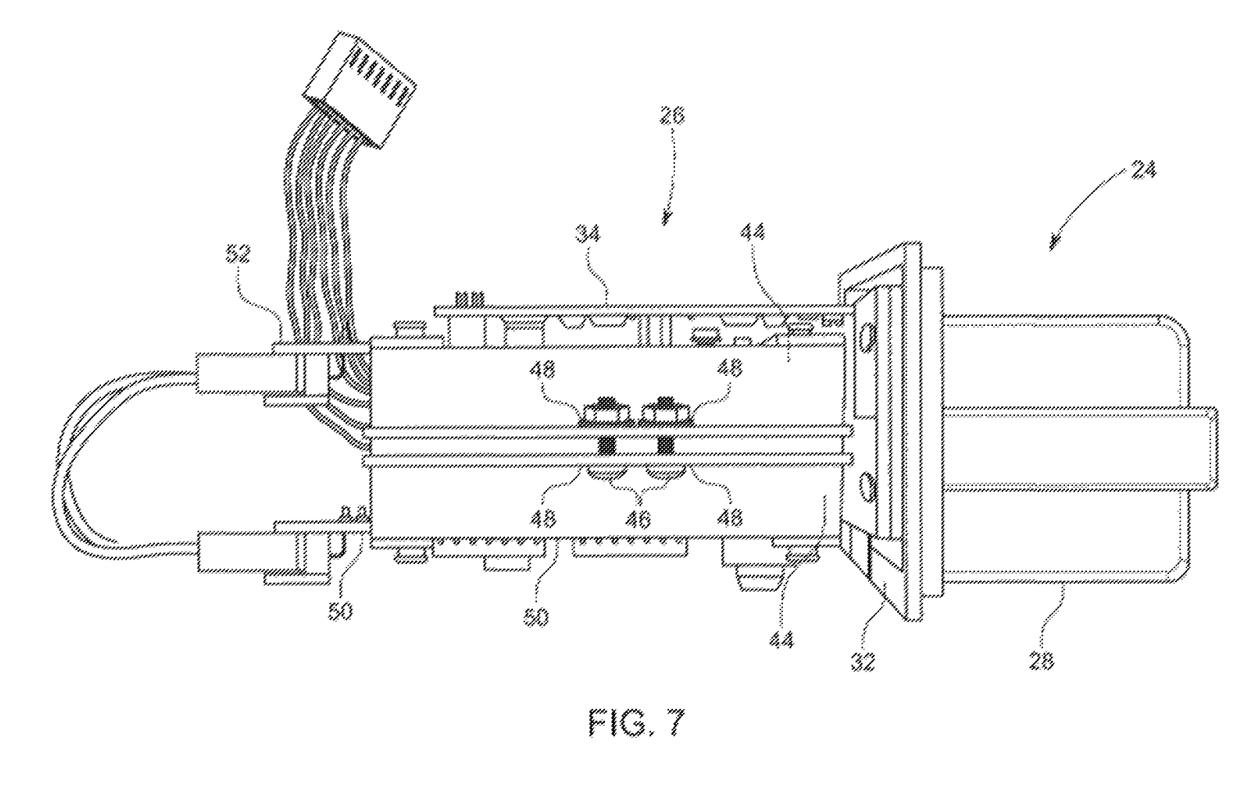
FIG. 7 is a bottom view of a credit card reader with the present invention installed.
Figure 8:
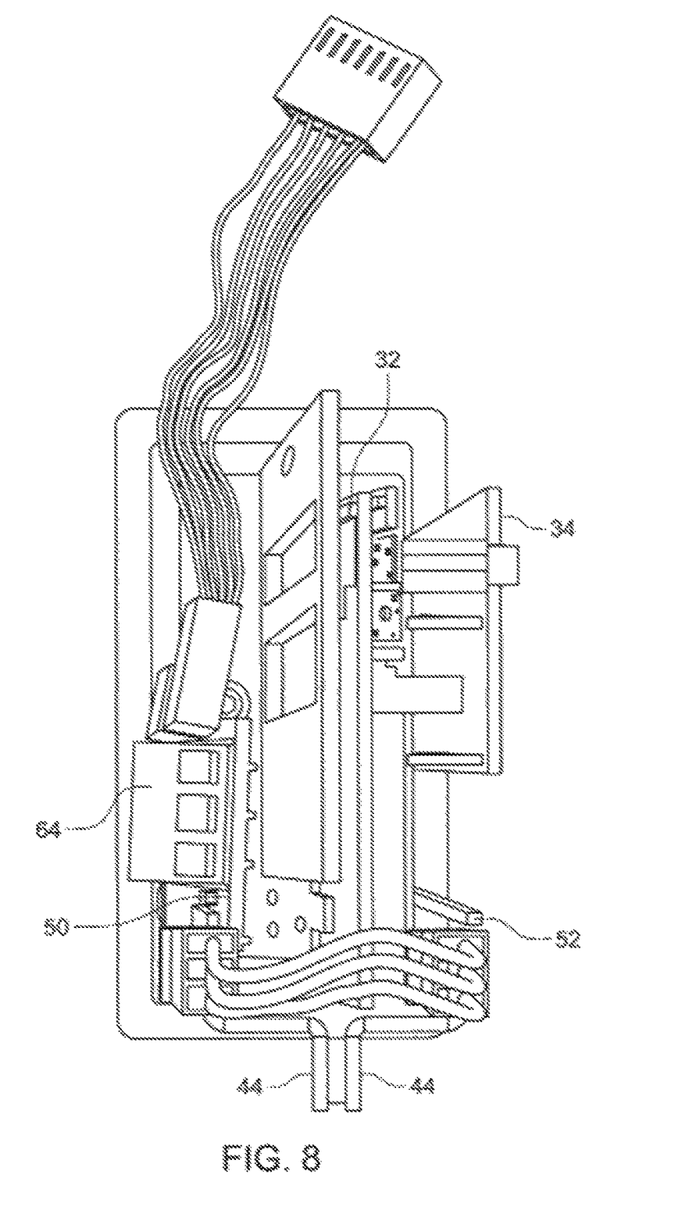
FIG. 8 is a backend view of a credit card reader with the present invention installed.

However, advancements in the pirates' methods have now lead to skimmers which can be installed without opening a service panel on the kiosks. These improved skimmers, as seen in FIG. 1, are inserted into the throat of the card reader in the kiosks. Thus, the pirate installs the improved skimmers by merely walking up to the kiosk and inserting and leaving the skimmer in the card reader. The exterior end of the skimmer is configured to look like a part of the original card reader. The skimmer then reads the digital data from the credit cards at the same time as the card reader obtains the information for the legitimate transaction. Here again the pirate can later obtain the digital information wirelessly or by retrieving the skimmer and its memory card.

The latest generation of card readers rely on obtaining information from a computer chip on the card and not a magnetic strip. Thus, they are not vulnerable to skimmers like the previous generation of card readers. However, the existing millions of credit card readers using the previous generations of technology remain vulnerable to attack by credit card skimmers. These older credit card readers need a system and method which protect them from attack by skimmers.

What is needed, therefore, is a method and device to detect the presence of an improved skimmer in the throat of a kiosk credit card reader.

BRIEF SUMMARY OF THE INVENTION

The present invention achieves its objections by providing a detector and method to detect the presence of an improved skimmer in the throat of a kiosk credit card reader. A light source and a light sensor are located on opposing sides of a card slot on the credit card reader. When the light source is blocked from the light sensor for a predetermined length of time, an alarm is triggered. The alarm may notify an attendant or security to investigate any issues with the credit card reader. The light source is pulsed on and off at a predetermined frequency to differentiate it from ambient light and other light sources.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT(S)

Turning now to the drawings wherein like reference characters indicate like or similar parts throughout, FIG. 1 illustrates an insertable credit card skimmer 20 previously discussed.

FIGS. 2-8 show a kiosk 22 equipped with a traditional credit card reader 24 equipped with skimmer detector 26 of the present invention. For purposes of this invention a kiosk 22 can be a gas pump, ATM or other vending machine which conducts a transaction with a customer without the actions of a clerk or attendant. The card reader 24 has a face 28 with a throat 30 through which the card is inserted into the slot 32. The face 28 is the portion of the card reader 24 that can be seen from the front of the kiosk 22. The slot 32 is located behind the face 28 inside the kiosk 22. The slot 32 is typically formed from a clear acrylic or other plastic. The magnetic strip reader 34 is secured adjacent to the slot 22, typically on the upper left-hand side of the slot 32. However, the strip reader 34 could secured to the right or left-hand side of the slot 32, upper or lower portion of those sides or any combinations thereof.

When a skimmer 20 is inserted into the card reader 24 it blocks the slot 32 such that light cannot pass from one side of the slot 32 to the other. The present invention includes a light source 36 on one side of the slot 32 and a light sensor 38 on the opposing side of the slot 32. When the slot 32 is open (i.e. no card and no skimmer) the light sensor 38 senses the light from the light source 36. When the slot 32 is blocked by a card or skimmer the light sensor 38 cannot sense the light from the light source 36. It is anticipated the use of a card will temporarily block the light source 36, typically only a couple of seconds. Whereas as a skimmer 20 will block the light source 36 hours, days or weeks.

The light sensor 38 periodically sends a signal to a microprocessor 40 indicating whether the slot 32 is open or has an object in it (i.e. whether it senses the light from the light source 36). If the condition of the slot 32 having an object in it persists for longer than a predetermined time, the microprocessor 40 sends out an alarm signal. The signal may be sent to an attendant to have them check the card reader 24 for a skimmer 20. The attendant can take such actions has necessary including, but not limited to, removing a skimmer 20, notifying authorities of the criminal activities or simply retrieving a credit card left behind by a customer.

The fact the slots 32 are typically constructed of clear plastic can create difficulties for the sensor during a portion of the day when the sun is shining directly on the face 28 of the card reader 24. This typically happens in the morning hours for card readers 24 facing east and in the evening for card readers 24 facing west. When the sun gets at a certain alignment the clear plastic of the slot 32 functions as a light tube or fiber optic cable transmitting the light along the slot 32. This makes it difficult, if not impossible, for the light sensor 38 to differentiate between the sun light and the light from the light source 36. When this occurs, the sensor will always see light regardless of whether the card slot is occupied.

This difficulty can be overcome by using an infrared light source 36 which blinks or cycles off and on at a predetermined frequency. The microprocessor 40 operates the light source 36 to flash on and off at a given frequency. The light sensor 38 picks up the light source 36 and transmits the information of whether the light source is seen by the light sensor 38. The microprocessor 40 takes the information from the light sensor 38 and determines the frequency of the observed light source 36. If a light source 36 with the predetermined frequency is not observed by the light sensor 38 for a predetermined length of time the microprocessor 40 sends an alarm signal. While any range of frequencies could be used, the preferred embodiment is to use 750 to 850 Hz (i.e. 800 Hz+1-100 Hz).

The latest generation of card readers 24 rely on obtaining information from a computer chip on the card and not a magnetic strip. Thus, they are not vulnerable to skimmers 20 like the previous generation of card readers 24. These credit card readers 24 can be equipped with the present invention when originally manufactured. However, the larger need is for protection of the earlier generation credit card readers 24. Thus, one embodiment of the present invention is a retro fit kit 42 to add the present invention to the previous generation of card readers 24 already in use in the field.

The retro fit kit 42 has a bracket 44 which can be secured to the slot 32. This is preferably done with one or more fasteners 46 passing through the holes 48 found on the bottom of the slot 32. A first printed circuit board 50 is secured to the bracket 44 on one side of the slot 32. A second printed circuit board 52 is located on the opposing side of the slot 32.

This skimmer detector 26 is powered by a power source 54. One embodiment of the power source 54 is shown in FIGS. 2-10. The first printed circuit board 50 has a first set of connectors 56 which are connectable to the wires 58 (power line and data line) from the kiosk and leading to the card reader 24. A second set of connectors 60 are used to pass the power line and data line connection to the wires 62 on the card reader so that it can function in its normal manner.

In the preferred embodiment the first and second printed circuit board 50 and 52 are electronically connected. The first printed circuit board 50 has a microprocessor 40, a light sensor 38 and an alarm output 64. The second printed circuit board 52 has a light source 36 which is controlled by the microprocessor 40 on the first printed circuit board 50. As explained earlier, the microprocessor 40 controls the frequency of the light source 36. The light sensor 38 detects the operation of the light source 36 and provides that data to the microprocessor 40. The microprocessor 40 has a timer 66. If the light sensor 38 does not detect the light source 36 for a period exceeding a predetermined time, the microprocessor 40 sends an alarm signal to the control system 68 of the kiosk 22. This alarm will signal an attendant to assess the situation either in person, through video surveillance or other means.

Figure 9:
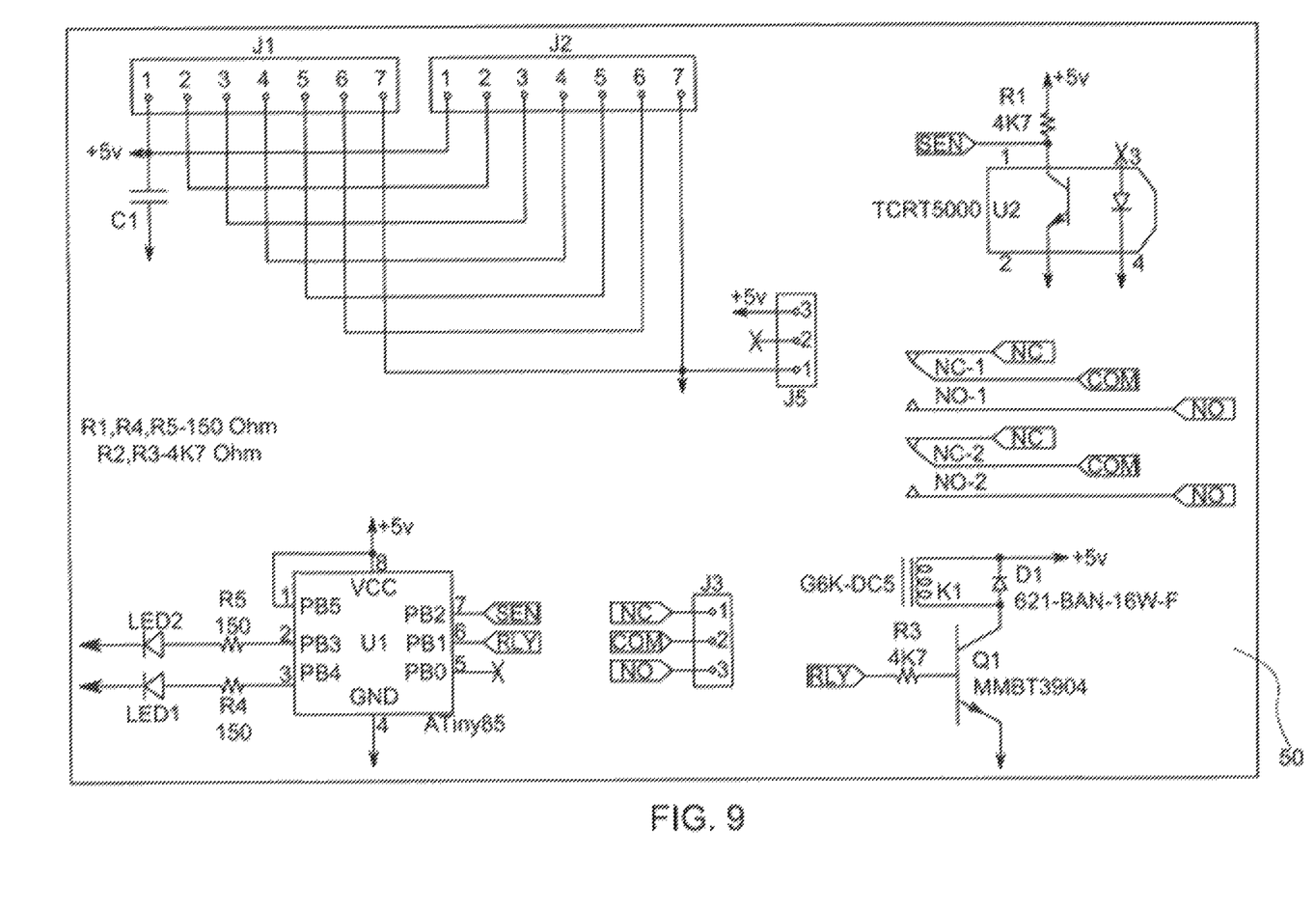
FIG. 9 is a circuit diagram of the first printed circuit board of the present invention.
Figure 10:
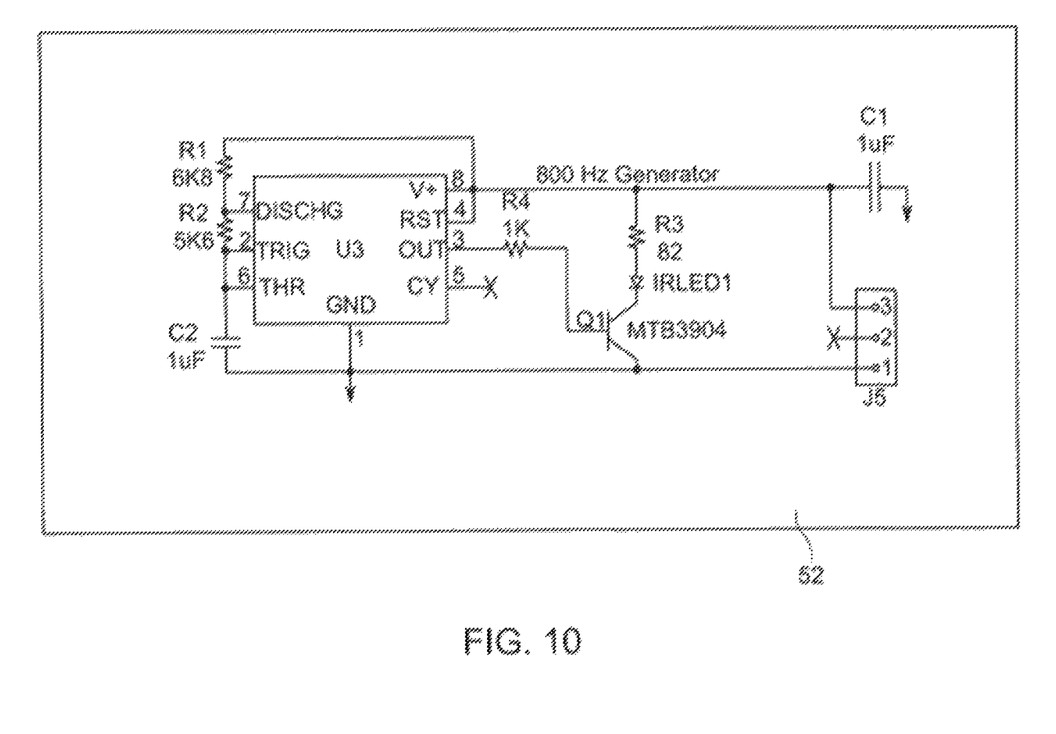
FIG. 10 is a circuit diagram of the second printed circuit board of the present invention.

FIGS. 9 and 10 are circuit diagrams of the preferred embodiment of the first and second circuit board 50 and 52. FIGS. 11 and 12 provide the preferred embodiment of the programming of the microprocessor 40. These should not be viewed as limiting the present invention rather they provide additional information on one embodiment of the present invention.

While the exact code for the computer program may vary, the following provides one embodiment of the code which can be used to carry out the present invention.

| | |
|---|---|
| Int Htime; | //integer for storing high time |
| Int Ltime; | //integer for storing low time |
| float Ttime; | //storing frequency |
| unsigned long currentMillis; | //variable for current millis value |
| unsigned long previous Millis=0; | //variable for the previous millis value |
| const long interval=60000; | //value of the time-out before alarm is tripped |
| int card_detect=0; | //set the value of this variable to zero |
| void setup( ) | |
| { | |
| pinMode(1, OUTPUT); | //sets pin 5 as output - RELAY OUTPUT |
| pinMode(3, OUTPUT); | //sets physical pin 2 as output - RED LED |
| pinMode(4, OUTPUT); | //sets physical pin 3 as output - GREEN LED |
| pinMode(2, INPUT); | //defines physical pin 7 as an input |
| for (int x+0; x<5; x++) | |
| { | |
| DigitalWrite(4, HIGH); | //turn ON the green LED delay(150); |
| digitalWrite(4, LOW); | |
| delay(150); | |
| } | |
| digitalWrite(1, LOW); | //sets pin 5 low - Relay OFF |
| digitalWrite(3, HIGH); | //sets pin 3 High - Green LED |

-continued

```
                                ON
digitalWrite(4, LOW);           //set pin 4 low - Red LED OFF
}
void loop ( )                   //main program loop
}
currentMillis =millis( );       //assign the micro's value of
                                  millis to the variable
Htime+pulseIn(2, HIGH);         //reads plse high time
Ltime=pulseIn(2, LOW);          //reads puls low time
Ttime=Htime+Ltime;              //used to calculate the
                                  incoming frequency
Frequency=1000000/Ttime;        //getting frequency with
                                  Ttime in Microseconds and
                                  converting that to frequency
If ((frequency>750 && (frequency<850)) //check to see if the
                                  incoming frequency matches
                                  targeted range
{
card_detect=0;                  //set a flag declaring that card
                                  detect is LOW
digitalWrite(3, LOW);           //turn OFF the Green LED
                                  indicator
digitalWrite(4, HIGH);          //turn ON the Red LED
                                  indicator
delay(250);                     //wait a quarter of a second
previousMilli s =currentMillis; //reset the value of
                                  previous_millis with the
                                  current value
digital Write(4, LOW);
}
else
{
Card_detect=1;                  //set this flag high
DigitalWrite(4, LOW);           //sets pin 4 LOW
digitalWrite(3, HIGH);          //sets pin 3 HIGH
delay(250);                     //wait a quarter of a second
digitalWrite(3, LOW);           //sets pin 3 LOW
if (currentMIllis-previousMillis>=interval) //do the math, calculate
                                  the difference between the
                                  two variables
{                               //do this code if the interval
                                  time has been met or exceeded
digitalWrite(3, HIGH);          //turn ON the red LED
digitalWrite(1, HIGH);          //activate the relay
while(true);                    //get lost in here and never
                                  come out - reset will occur
                                  when pump is recycled
}
}
delay (200);
digitalWrite(4, HIGH);
```

The foregoing description details certain preferred embodiments of the present invention and describes the best mode contemplated. It will be appreciated, however, that changes may be made in the details of construction and the configuration of components without departing from the spirit and scope of the disclosure. For example, the light source may be located on the first circuit board and the light sensor on the second circuit board. Similarly, the exact location of the circuit boards and the manner in which they are secured to the credit card slot may also vary.

Further, while the disclosure of the present invention refers to credit cards, this term should be understood to include debit cards, bank cards, gift cards and any other type of magnetically read card used to carry out a business transaction. Therefore, the description provided herein is to be considered exemplary, rather than limiting, and the true scope of the invention is that defined by the following claims and the full range of equivalency to which each element thereof is entitled.

What is claimed is:

1. A skimmer detector for a credit card reader, the skimmer detector comprising:
   a light source capable of generating a light and pulsing the light on and off at a predetermined frequency;
   a light sensor; and
   a microprocessor;
   wherein the light source and light sensor are on opposing sides of a card slot of the credit card reader and the microprocessor is capable of controlling the pulsing frequency at which the light source operates and is capable of determining the pulsing frequency of a light received by the light sensor.

2. The skimmer detector of claim 1, further comprising:
   the microprocessor having a timer and being capable of determining when the pulsing light has not been received by the light sensor for a predetermined time period.

3. The skimmer detector of claim 2 further comprising:
   the microprocessor has an alarm output;
   wherein the microprocessor being capable of sending an alarm signal when the pulsing light has not been received by the light sensor for a predetermined time period.

4. The skimmer detector of claim 1 further comprising:
   a bracket securable to the card slot of the credit card reader.

5. The skimmer detector of claim 4 further comprising:
   a first circuit board mounted on the bracket;
   wherein the microprocessor and light sensor are located on the first printed circuit board.

6. The skimmer detector of claim 5 further comprising:
   a second circuit board;
   wherein the light source is located on the second circuit board and the microprocessor controls the operation of the light source.

7. The skimmer detector of claim 6 further comprising:
   a second connector on the first circuit board connectable to a power line and data line on the magnetic strip reader;
   an alarm output on the first circuit board;
   a power and data connection between the first and second circuit boards;
   wherein the power to operate the skimmer detector is provided through the first connector on the first circuit board.

8. Method of detecting a skimmer in a credit card reader, the method comprising:
   positioning a light source and a light sensor on opposing sides of a card slot of the credit card reader;
   providing an optically clear pathway between the light source and the light sensor;
   operating the light source;
   sensing the presence of light from the light source through operation of the light sensor;
   issuing a warning signal when the absence of the presence of light from the light source exceeds a predetermined time period; and
   operating the light source to cycle a light on and off at a predetermined frequency; and
   determining whether the light sensed is cycling on and off at the same frequency as the predetermined frequency of the light source.

9. The method of claim 8, further comprising:
   securing a bracket to the card slot; and
   supporting the light source and the light sensor from the bracket.

* * * * *